(12) United States Patent
Sood et al.

(10) Patent No.: US 6,377,811 B1
(45) Date of Patent: Apr. 23, 2002

(54) WIRELESS COMMUNICATIONS SYSTEM AND METHOD OF VIRTUAL LINE/DIRECT STATION SELECTION

(75) Inventors: Prem Sood; Akihito Fukuyasu, both of Vancouver; Gerald Maliszewski, Camas, all of WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/162,335

(22) Filed: Sep. 28, 1998

(51) Int. Cl.[7] ............................................. H04Q 7/32
(52) U.S. Cl. ..................................... 455/464; 455/455
(58) Field of Search ................................. 455/403, 564, 455/565, 465, 462, 554, 555, 455, 464; 379/216, 355, 50, 56

(56) References Cited

U.S. PATENT DOCUMENTS

| | | | |
|---|---|---|---|
| 5,239,572 A | | 8/1993 | Saegusa et al. ............... 379/61 |
| 5,384,825 A | * | 1/1995 | Dillard ......................... 379/59 |
| 5,424,859 A | | 6/1995 | Uehara et al. ............... 359/152 |
| 5,491,745 A | * | 2/1996 | Roeder ....................... 379/355 |
| 5,517,551 A | * | 5/1996 | Arai ............................. 379/58 |
| 5,551,073 A | * | 8/1996 | Sammarco .................... 379/58 |
| 5,657,375 A | | 8/1997 | Connolly et al. ............ 455/436 |
| 5,664,005 A | | 9/1997 | Emery et al. ................ 455/422 |
| 5,675,630 A | * | 10/1997 | Beatty ......................... 379/59 |
| 5,687,218 A | | 11/1997 | Nakayama .................... 379/61 |
| 5,848,356 A | * | 12/1998 | Jambhekar ................... 455/403 |
| 5,901,365 A | * | 5/1999 | Yasuda ........................ 45/564 |
| 6,041,226 A | * | 3/2000 | Skoro ......................... 455/405 |
| 6,167,262 A | * | 12/2000 | Tanigawa .................... 455/426 |

* cited by examiner

Primary Examiner—Daniel Hunter
Assistant Examiner—Nick Corsaro
(74) Attorney, Agent, or Firm—David C. Ripma; Matthew D. Rabdau; Scott C. Krieger

(57) ABSTRACT

A system and method is provided to permit a mobile phone the options of line-selection and direct station selection (DSS). When the wireless system is interfaced to a land-line system through a limited number of lines, dual-function keys select and capture available outside lines. Other dual-function keys permit other mobile stations in the system to be accessed through a single keystroke. A field of indicators associated with these keys signals the availability of these lines and stations. These line-select/DSS keys are also useable to dial telephone numbers in the traditional method. The virtual line-select concept is also applicable to select land-lines and wireless channels in a group distributed network. Likewise, the virtual DSS function is applicable to monitor and access a select group of mobile stations in the group-distribution system.

38 Claims, 4 Drawing Sheets

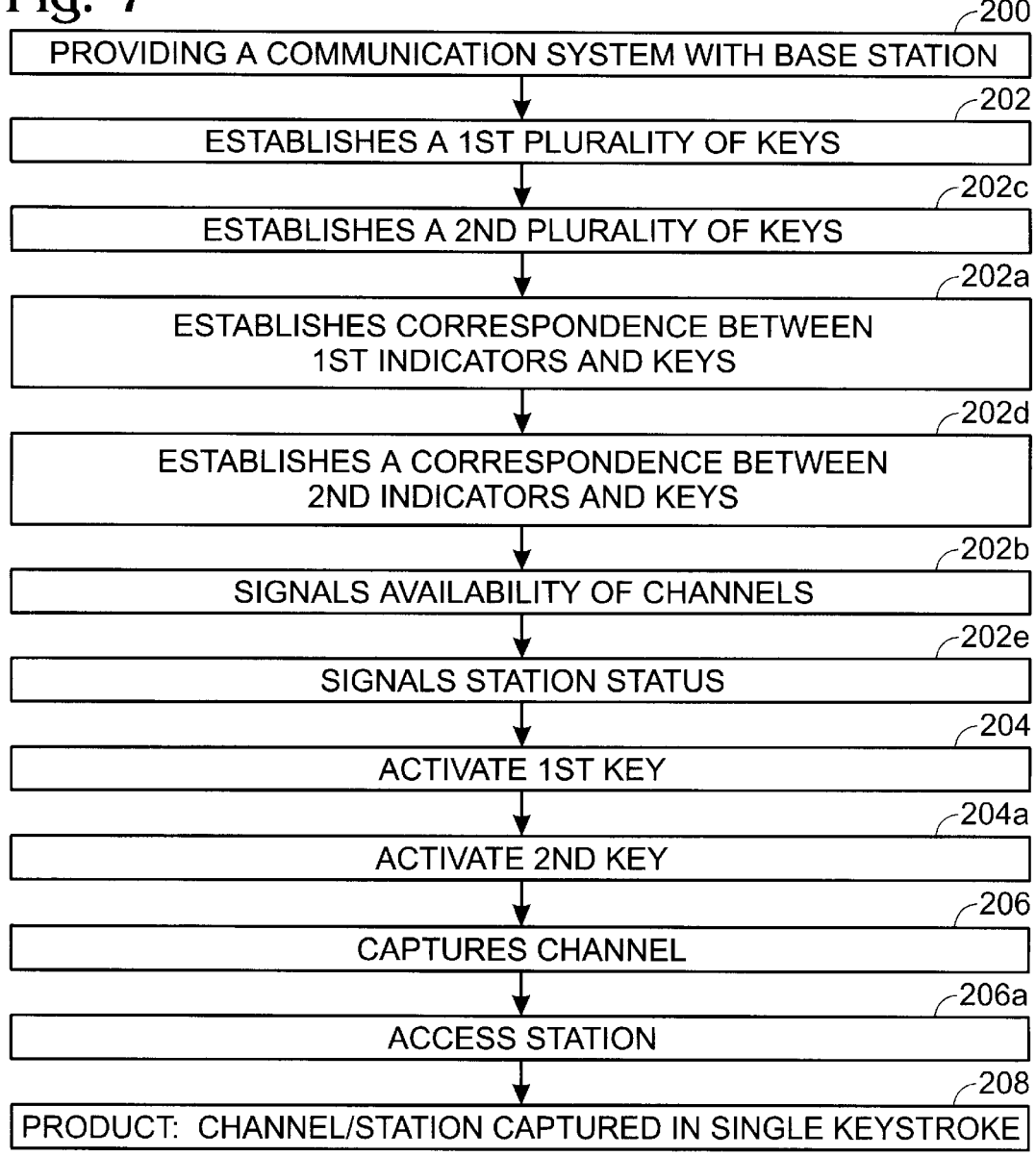

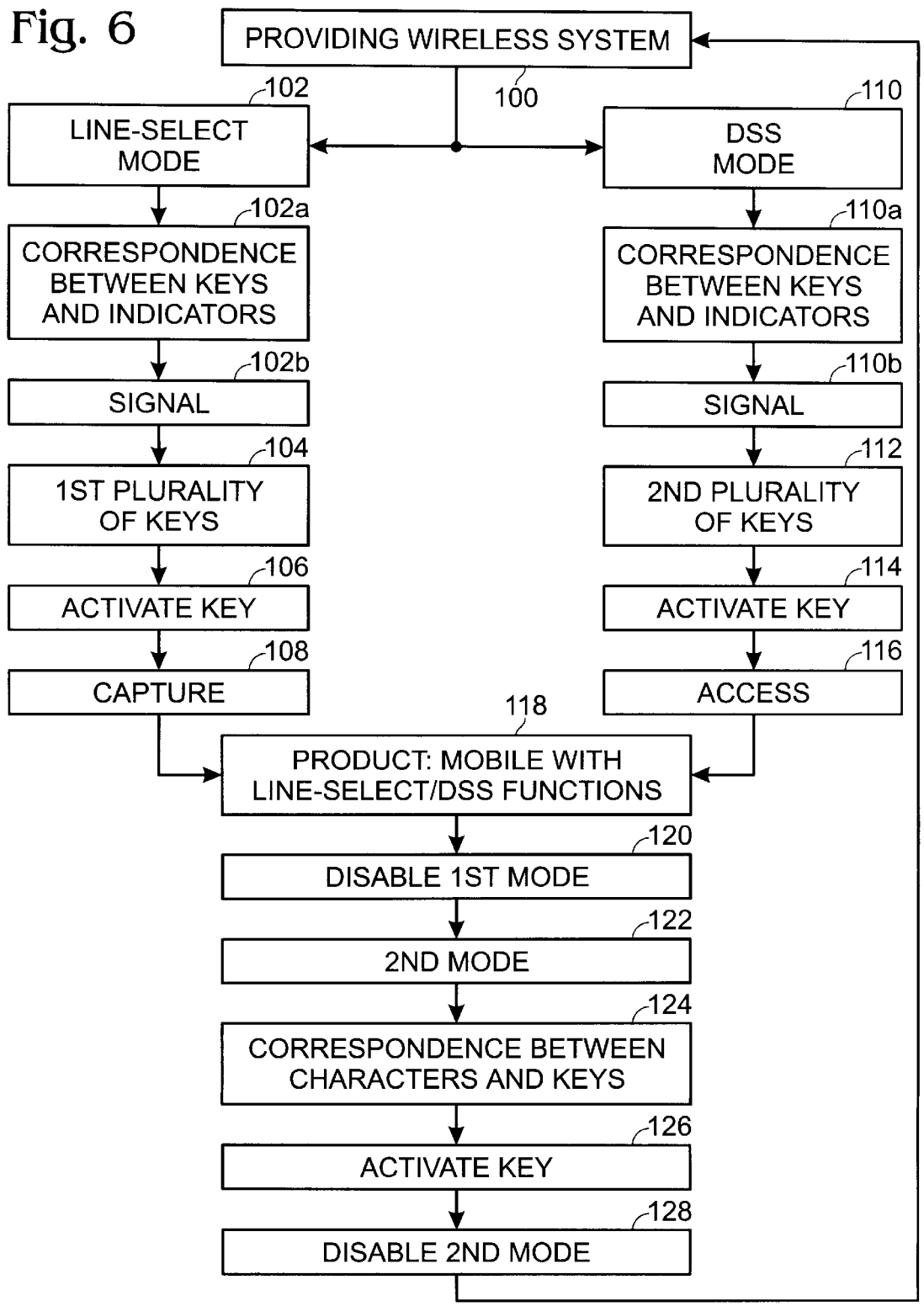

WIRELESS COMMUNICATIONS SYSTEM AND METHOD OF VIRTUAL LINE/DIRECT STATION SELECTION

BACKGROUND AND SUMMARY OF THE INVENTION

This invention is related generally to wireless communications and, more particularly to a system and method of incorporating the line-selection and direct station selection (DSS) functions, associated with land-line telephones into wireless communication systems such as cellular telephone and personal communication systems (PCS).

The use of line-selection buttons is well known with traditional land-line services, especially in a business environment. A business office of many phones, for example, ten phones, may only have access to a smaller number of outside lines, for example, three lines. Each phone is then equipped with at least three special keys that allow a telephone user to capture, or select an outside line.

Each telephone is also equipped with the set of lights it, corresponding to each line selection key. These lights, or indicators are called a busy lamp field (BLF). The BLF indicators signal the availability of corresponding outside lines. The BLF indicators of participating phones signal users that a line has been captured, when one of the group phones is using that particular line.

The phones may also be equipped with DSS buttons. Then, each phone or station corresponds to a particular DSS button. The user of one phone can directly access another phone in the system by simply pushing a DSS button. This DSS function may exist even though the phones all have unique telephone numbers.

Associated with each DSS button is a busy lamp field indicator. The BLF lamp signals to each phone in the system, the status of each participating phone. The lighting of the BLF lamp lights is patterned to signal different statuses. One particular pattern may signal that a phone is being used. Other signal patterns indicate when the phone is idle, on hold, or ringing.

Many cellular system are also limited in the number trunk lines available in the system between base stations and mobile switching centers (MSCs), or between MSCs and the land-line telephone network. However, the real bottle-neck is in the number of wireless channels available. Crowding of wireless channels is especially prevalent during certain times of the day. Little has been done to warn a user of a high system load, and likelihood of being able to complete a call, before the call is attempted. Little has been done to insure a higher probability of making and completing a call for users willing to pay an extra premium.

It would be advantageous if a wireless communications system could be organized to provide a DSS function between a selected group, or sub-group of mobile stations.

It would be advantageous if a wireless communications system could be established in a local system interfaced to existing telephone land-lines and providing a land-line selection capability.

It would be advantageous if users of a group-distributed, or public communications system had the capability of reserving wireless communication channels. Further, it would be advantageous if the users had virtual DSS capability. When interfaced with a private wireless system, it would be advantageous if a user had line selection privileges in the private system when operating in either the private or public systems, Accordingly, a system including transceiving mobile stations with direct station selection (DSS) and line-select modes of operation is provided. One communications system includes at least one dedicated transceiving base station interfaced to a first subset of telephone circuits to form a private wireless network. Each mobile station comprises a set of keys, which when activated, operate in the line-selection and DSS mode. A first subset of keys are line-select keys, and a second subset of keys are DSS keys. Each of the first subset of line-select keys corresponds to a telephone circuit, typically the telephone circuit is an analog or digital land-line including time division multiplex (TDM) and integrated services digital network (ISDN). In some aspects of the invention, the dedicated base station is interfaced to the main land-line system through wireless channels. It is transparent to the user whether these telephone circuits are themselves land-lines, or are wireless. The telephone circuit is selected in response to activating a corresponding line-select key.

Each of the second subset of DSS keys corresponds to a like-numbered subset of mobile stations directly accessed by activating the DSS keys. In this manner, a dedicated land-line or station is selected with a single key stroke.

Typically, the mobile station includes a busy lamp field (BLF). The BLF is made up of line-select signal indicators whose number is equal to the number of keys in the first subset of line-select keys, plus the number of keys in the second subset of DSS keys. Each one of the line-select indicators corresponds to one of the line-select keys, and each one of the DSS indicators corresponds to one of the DSS keys. The line-select indicator signals the availability of the corresponding telephone circuit, and the DSS indicator signals the availability of its corresponding station. The DSS functions indicate whether another phone in the system is idle, busy, on hold, ringing, or turned off. Each function is associated with a unique BLF indicator signal.

In some aspects of the invention, the keys operate in a second, telephone keypad mode. The keys are each identified with corresponding telephone keypad alphanumeric characters, and are used to manually dial a telephone number. The dual-function keys permit the phone to operate in the traditional dialing mode. A mode switch selects between the line-select/DSS mode, and the keypad mode of operation.

The mode switch can be activated by the mobile station, or by a communicating base station. The mode switch can literally be a switch manually operated by the phone user. Alternately, the mobile station has a logic system with a predetermined set of conditions required to activate the mode switch. When the conditions are met, the mobile station automatically activates the mode switch to operate in the second, telephone keypad mode of operation, from the first mode, or vice versa.

The mode switch can also be enabled with the use of a keypad cover. Typically, the closing of the cover would switch the phone from the first to the second mode of operation. Since the cover conceals the BLF, there is no need to operate the BLF. Minimizing the use of the BLF saves battery power. Alternately, the cover disables the BLF without switching out of the first, line-select/DSS mode. Likewise, the cover can be used to automatically trigger the mode switch to engage the first, line-select/DSS mode when the cover is opened.

Ideally, the BLF indicators and alphanumeric characters are integral to said corresponding keys. This makes the correspondence between a key and its function very clear.

The BLF indicators can be lights, such as LEDs. Alternately, the integral BLF indicators are light arrays, such as LCDs. Further, the keys could be virtual keys on one large LCD screen equipped with sensors to determine if the virtual keys have been activated.

In some aspects of the invention, the line-select/DSS functions are available for use with a group-distributed, or public wireless network, where the stations maintain long-range monitoring of line-select/DSS functions using group-distributed system base stations as a relay. This arrangement would allow a phone in the private system to monitor a DSS mobile when it was far from the dedicated local system base station. Further, the DSS mobile registered in the public system can use the line-select function so that its calls are monitored and billed as if the mobile was registered in the private system. Alternately, at least a DSS mode can be established between a select group of mobile stations through just the use of a group-distributed system of base stations, and a modification of existing protocols. That is, one DSS capable mobile phone can be used to monitor the status of a select group of phones operating in a large network of hundreds of base stations and thousands of mobile stations.

To insure communication links between mobile stations in crowded group-distributed systems, the present invention permits special users priority use of wireless channels interfacing participating mobile stations and public system base stations. These special user mobiles access the reserved wireless channels through the line-select (now called a channel-select) function of the mobile phone. BLF indicators signal the availability of priority channels. The DSS and keypad modes of operation can also be added to the channel-select system.

A method of operating mobile stations in the line-select/DSS modes of operation is also provided. The line-select mode operates as follows:

1) establishing a first subset of keys having the lines selection function, with each line-select key corresponding to a telephone circuit;
2) activating a line-select key corresponding to an available telephone circuit; and
3) in response to activating the line-select key, capturing the telephone circuit for use by the mobile station.

The DSS mode operates as follows:

1) establishing a second subset of keys having the DSS function, with each DSS key corresponding to one of the stations;
2) activating a DSS key; and
3) in response to activating the DSS, accessing the corresponding station, whereby the mobile station is able to select land-lines and directly link to a predefined group of stations.

A subset of busy lamp field (BLF) indicators are provided, including a first subset of line-select indicators, with each line-select indicator corresponding to one of the telephone circuits, and a second subset of DSS indicators, with each DSS indicator corresponding to a station. The method includes steps to establish a correspondence between the line-select indicators and the line-select keys. Then, the line-select indicators are used to signal the availability of the telephone circuits. The line-select key is activated in response to the line-select indicator signal. Likewise, steps are included to establish a correspondence between the DSS indicators and the DSS keys. The DSS indicators signal the status of the stations, and the DSS key is activated in response to the DSS indicator signal.

As in a traditional phone, alphanumeric indicators are provided, and the mobile stations incorporate a second, telephone keypad mode of operation. The method comprising the additional steps of:

disabling the first, line-select/DSS mode of key operation, and enabling the second, telephone keypad mode;
establishing a correspondence between the alphanumeric indicators and the keys; and
activating the keys to manually dial a telephone number.

BRIEF DESCRIPTION OF THE DRAWINGS

FIG. 5 illustrates a channel-select feature of the present invention.

FIG. 6 is a flowchart illustrating a method of incorporating line-select/direct station selection (DSS) modes of operation in a mobile stations.

FIG. 7 illustrates a flowchart of an alternate aspect of the present invention method for operating in the channel-select mode.

DETAILED DESCRIPTION OF THE PREFERRED EMBODIMENT

Figure 1:
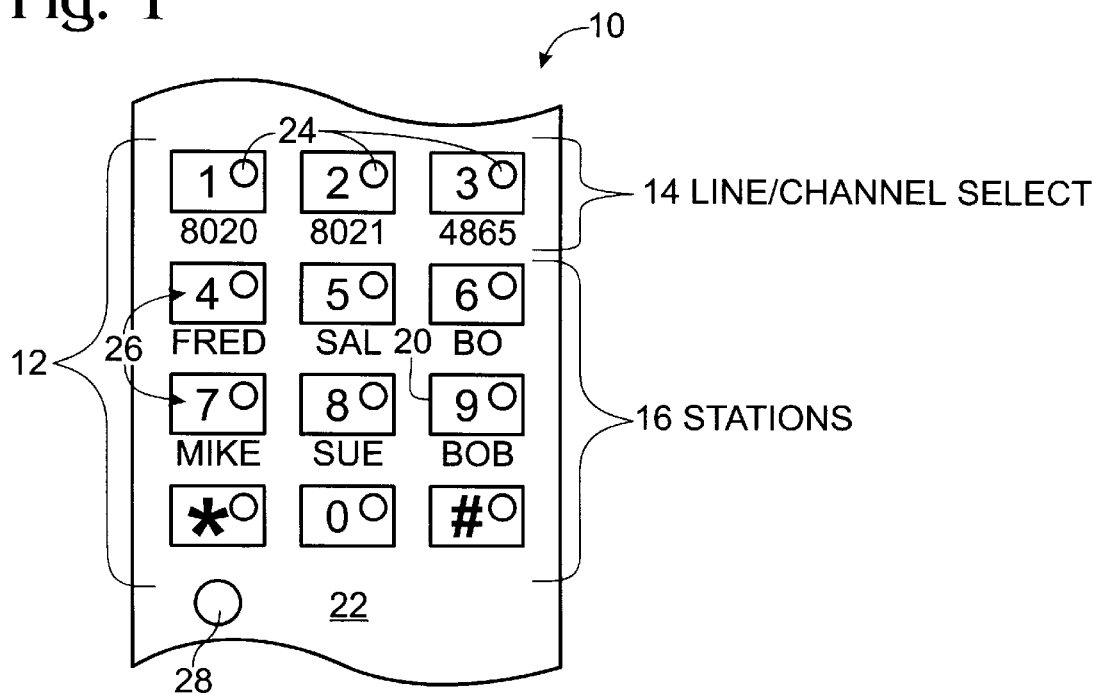
FIG. 1 is a schematic block diagram of a mobile station with direct station selection (DSS) and line-select modes of operation.

FIG. 1 is a schematic block diagram of a mobile station with direct station selection (DSS) and line-select modes of operation. Mobile station 10 operates in a communications system including at least one dedicated, private transceiving wireless base station (see FIG. 4) interfaced to a first plurality of telephone circuits. The system typically includes a plurality of transceiving wireless mobile stations. Each mobile station 10 comprises a plurality of keys 12, which when activated, operate in the line-select and DSS mode. A first plurality of keys 12 are line-select keys 14 and a second plurality are DSS keys 16.

First plurality of line-select keys 14 correspond to a telephone circuit. That is, each key corresponds to a specific dedicated telephone land-line whether the land-line system is analog, digital, TDM, ISDN, or other related and similar communication systems. In some aspects of the invention, telephone circuits are considered to be wireless channels interfacing the dedicated private base station to the central hard-line telephone network, which itself may also include wireless connections in the trunks. The telephone circuit is transparent to the user of mobile 10. That is, the user need not be aware of the specific type of telephone circuit in use. The corresponding telephone circuit, of whatever type, is selected in response to activating one of line-select keys 14. In this manner, a dedicated land-line is selected with a single key stroke.

Second plurality of DSS keys 16 correspond to a second plurality of stations directly accessed by activating DSS keys 16. Each station is a specific mobile station. For example, as shown in FIG. 1, the activation of DSS key 20 accesses a mobile station identified as "Bob". Each DSS key 16 directly "dials" a specific station. In this manner, a dedicated station is selected with a single key stroke. Station 20 may, or may not have an actual (conventional) phone number.

In some aspects of the invention, mobile station 10 includes a busy lamp field (BLF). The BLF includes a first plurality of line-select signal indicators and a second plurality of DSS signal indicators, with each one of the line-select indicators corresponding to one of line-select keys 14. Likewise, each one of the DSS indicators corresponds to one of DSS keys 16. That is, there is a BLF indicator for every dual-function key 12.

Each line-select indicator signals the availability of the corresponding telephone circuit. Each DSS indicator signals the availability of its corresponding station. In this manner, the indicators signal the availability of stations and dedicated land-lines. In some aspects of the invention, the indicators are arranged in a separate section of keypad 22 of mobile station 12. In other aspects, each indicator is located on keypad 22 near its corresponding key 12. FIG. 1 specifically shows BLF indicators 24 and alphanumeric characters 26 being integral to its corresponding key, whereby each key 12 signals its function. Typically, integral BLF indicators 24 are lights, such as LEDs. In some aspects of the invention, the indicators are audio, in other aspects, audio and visual BLF indicators 24.

Figure 2:
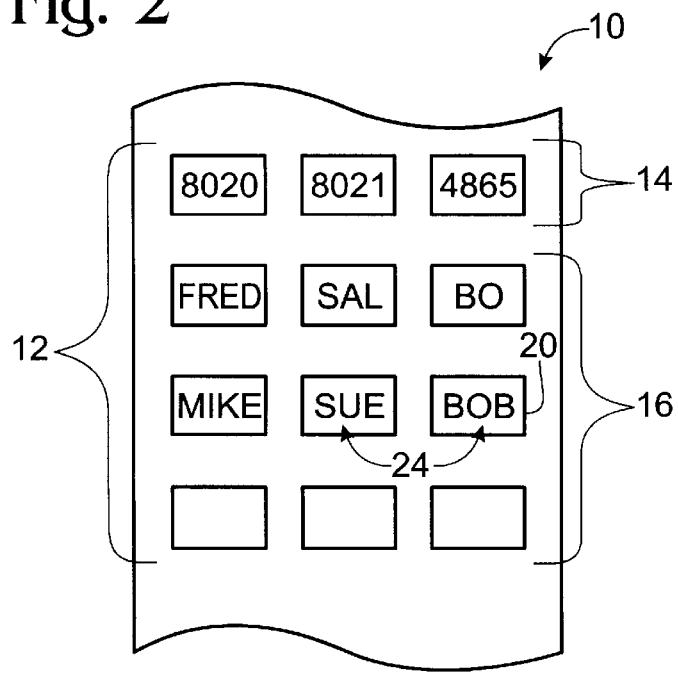
FIG. 2 illustrates an alternate embodiment of the BLF indicators of the present invention.

FIG. 2 illustrates an alternate embodiment of the BLF indicators of the present invention. The integral BLF indicators 24 take the form of light arrays to communicate patterns of alphanumeric characters and pictures, whereby the line-select/DSS functions are clear to the user. That is, in the line-select/DSS mode of operation, the station associated with DSS key 16, is displayed on key 16. For example, the station name "Bob" is shown displayed on DSS key 20. The name "Bob" then flashes in a manner similar to the simple light indicator 24 of FIG. 1 to signal the availability of station "Bob". When keys 12 are not functioning in the line-select/DSS mode, then the line numbers and station identifiers are replaced with a display of the traditional alphanumeric characters, or left unlit to save battery power. In the simplest form the light array is a set of alphanumeric character display. More complex arrays could be built from LCD technology. In one aspect of the invention, not shown, keys 12 are virtual keys formed on a touch, or otherwise sensitive, display. Then, virtual keys 12 and the BLF indicators 24 are the same. That is, BLF indicators 24 and keys 12 are integral to an LCD display with sensors, with keys 12 being virtual keys that are virtually activated by interaction with the LCD screen. A relatively large LCD panel offers a variety of indicator options, such as virtual lights integral to the virtual keys, and different key colors.

Typically, first 14 and second 16 plurality of keys operate in a second, telephone keypad mode, when mobile station 10 is not operating in the line-select/DSS mode. A mode switch, when activated, selects between the line-select/DSS mode and the keypad mode of operation. Then, keys 12 are identified with a corresponding telephone keypad alphanumeric character, as shown in FIG. 1. Alternately, when indicator 24 is also used to identify the station or line as in FIG. 2, indicators 24 display alphanumeric characters, when keys 12 are enabled to operate in the second, keypad mode of operation. The second mode of operation permits keys 12 to manually dial a telephone number, whereby each mobile station's dual-function keys include the traditional dialing function. Alternately, when mobile station 10 is used in conjunction with a peripheral device such as an external keyboard or computer, keys 12 need not be literally manipulated to "dial" a phone number.

In some aspects of the invention, the mobile station mode switch is activated by the mobile station. In the simplest form, the mode switch is a mechanical switch 28. Otherwise, the mode switch is activated by a mobile station user command. For example, pressing keys 12 in predetermined sequence, or pressing multiple keys 12 together. In this manner, the user selects the mode of operation for said dual-mode keys. In some aspects of the invention, mobile station further comprises a logic unit (not shown) having an output operatively connected the mode switch, with logic unit activating the mode switch.

In some aspects of the invention, mobile station 10 includes a logic unit such as a microprocessor or state machine engine of software or hardware (not shown). When a logic unit is used, a list of criteria is loaded into mobile station 10 required to activate the mode switch. Mobile station automatically activates the mode switch to operate in the second, telephone keypad mode of operation, from the first mode, when criterion from the list is met. For example, one set of criterion includes enabling the second, keypad mode of operation after activating one of line-select keys 14. In this manner, a telephone number is subsequently dialed after a telephone line is secured.

Figure 3:
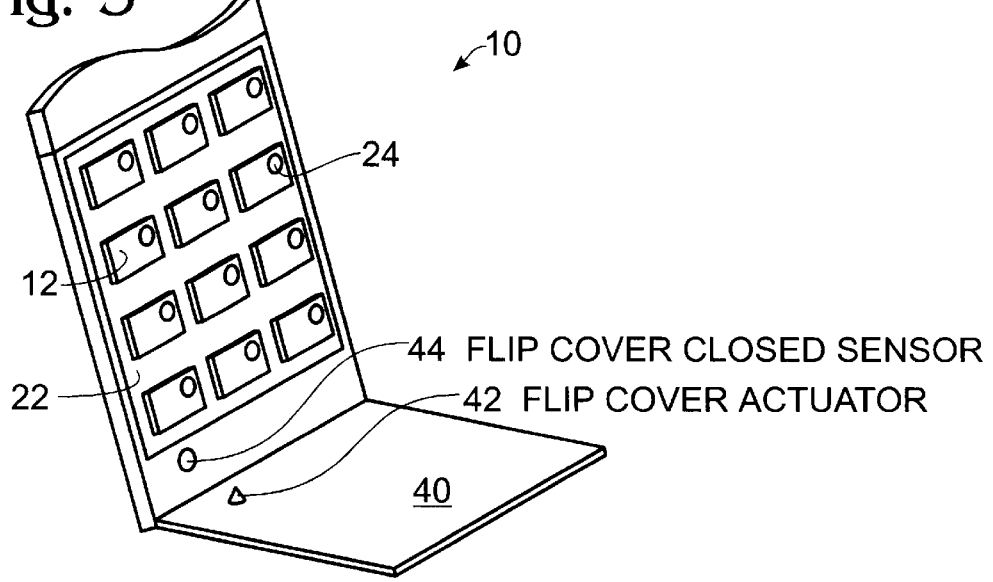
FIG. 3 illustrates the mobile station with a protective cover.

FIG. 3 illustrates mobile station 10 with a protective cover 40. Protective cover 40 closes to cover keys 12 and opens to reveal keys 12. Cover 40 is operatively connected to the mode switch so that the mode switch is automatically activated to select the second, telephone keypad mode of operation when cover 40 is closed. In this manner, battery power is saved by deactivating indicators 24. In one simple aspect of the invention, cover 40 includes a flip cover actuator 42 which engages a flip cover closed sensor 44, which is mode switch 28 of FIG. 1. Other methods of coupling the position of cover 40 to the mode switch are available.

In one aspect of the invention, the mode switch is automatically activated to select the first, line-select/DSS mode of operation when cover 40 is opened.

Alternately, cover 40 is coupled more directly to BLF indicators 24, without necessarily engaging a mode switch. Then, a BLF disable switch, when activated, disables BLF indicators 24. Protective cover closes to cover BLF indicators 24, and opens to reveal said BLF indicator 24. Cover 40 is operatively connected to said BLF disable switch. The BLF disable switch is automatically activated to disable BLF indicators 24 when cover 40 is closed, whereby battery power is saved by deactivating indicators 24. In one simple form, flip cover sensor 44 is the BLF disable switch. Alternately, a logic unit(not shown) has an input operatively connected to cover 40 and an output operatively connected the BLF switch. The logic unit activating the BLF disable switch when cover 40 is closed.

In the above examples, the decision to change modes of disable indicators 24 is made in mobile station. Alternately, these same decisions are made by a base station (not shown) and communicated to mobile station 10. For example, the base station switches mobile station's mode from the first, to the second, after the user of mobile station 10 activates a key to selection an outside line. Putting the decision making in the base station allows the mobile stations to be simpler. It also permits the base station to balance mobile station user requests against system requirements. In addition to the mode switch of mobile station 10 being activated by the communicating base station, in some aspects of the invention the base station also directs mobile station 10 to activate the BLF disable switch.

The DSS functions are selected from the group consisting of idle, busy, on hold, and ringing. These are well known functions, and not specifically defined herein. Other DSS functions include an "off" function which signals whether the station has their mobile station turned on (or whether the system can find the station). As in traditional DSS systems, each DSS function has a unique BLF indicator signal, whereby each DSS function has a distinct indicator signal pattern. For example, the indicator does not flash when the station is available, and flashes in sets of three when the station is off.

In some aspects of the invention, mobile station 10 has a direct, "walkie-talkie", mode of operation to communicate directly between selected mobile stations, without the base station acting as a relay. Then, a further DSS function is included, with its own unique BLF indicator signal to communicate whether a station is in the walkie-talkie mode.

Figure 4:
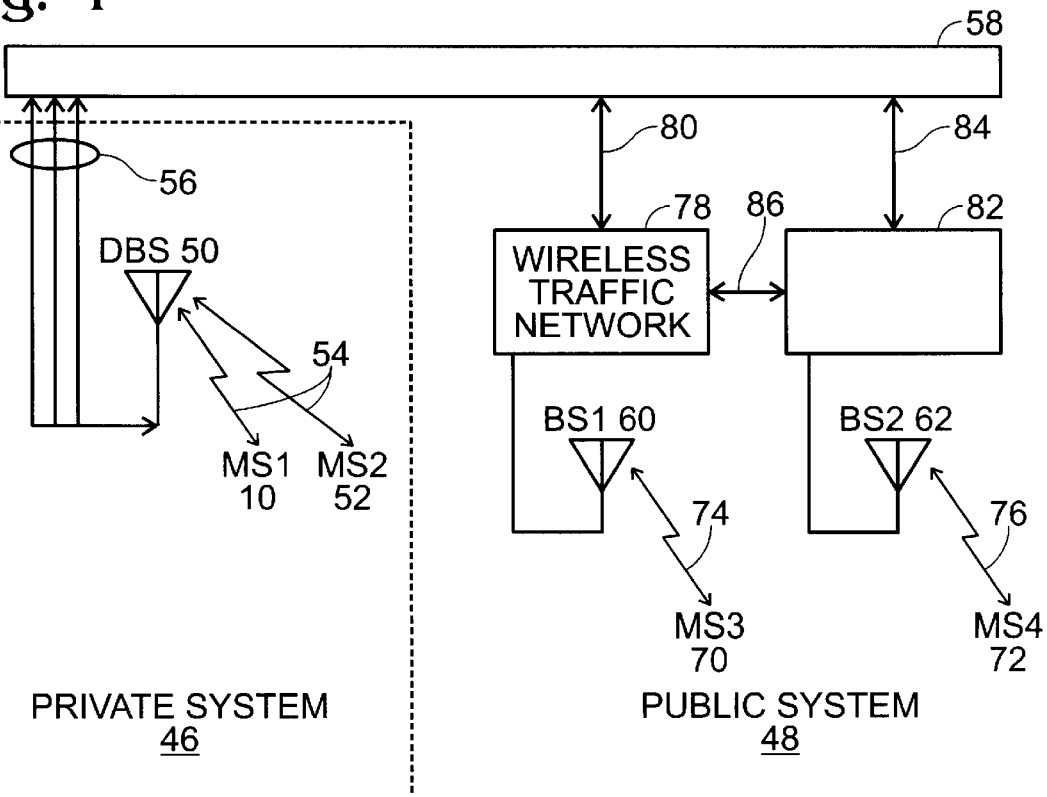
FIG. 4 illustrates the mobile station operating in a wireless communications system including a plurality of transceiving base stations.

FIG. 4 illustrates the mobile station operating in a wireless communications system including a plurality of transceiving base stations. Private 46 and public 48 systems are represented. Referring briefly back to FIG. 1, dedicated base station (DBS) 50 has wireless links to MS1 10 and MS2 52. The wireless links are represented by lines with the reference designator 54. DBS 50 also has telephone circuits 56 operatively connecting DBS 50 to a land-line, conventional telephone network 58. FIG. 4 shows 3 land-lines included in circuits 56. These three land-lines 56 are the lines selected by line-selects keys 14 (FIG. 1). Alternately, telephone circuits 56 are wireless channels in some aspects of the invention. FIG. 4 shows two stations MS1 10 and MS2 52 which are accessible to each other; with the use of DSS keys 16 (FIG. 1).

Base stations BS1 60 and BS2 62 are part of a plurality of transceiving public base stations in a group-distribution system servicing a plurality, typically thousands, of transceiving mobile stations, of which MS3 70 and MS4 72 are part, The wireless links between BS1 60 and MS3 70, and between BS2 62 and MS4 72 are represented, respectively, by lines with the reference designators of 74 and 76. BS1 60 is managed by wireless traffic network 78. Network 78 is operatively connected through trunks 80 to land-line network 58. Typically, trunks 80 include land-line links, but wireless and microwave links are also possible. Likewise, a wireless traffic network, or mobile switching center (MSC), or mobile telephone switching office (MTSC) 82 is operatively connected to land-line network 58 through trunks 84. MSC 78 and MSC 82 are operatively connected by dedicated trucks 86 in some aspects of the invention.

The use of the public system represented by BS1 60, BS2 62, land-line network 58, and MSCs 78 and 82 permit mobile stations MS3 70 to retain the direct station selection (DSS) mode of operation capability, with MS1 10 for example, even when MS3 70 is a great distance from DBS 50. As described above, each mobile station comprises a plurality of keys, including a second plurality of keys, which when activated operate in the DSS mode, with the second plurality of DSS keys corresponding to a second plurality of stations accessed by activating said DSS keys. In this manner, a virtual DSS system is established.

For example, MS3 70 is able to monitor the status of MS1 10 and access MS1 10 through the above-described DSS key functions, by using both the private and public systems. This is useful if the two stations are frequently communicating with each other. Thus, the indicators of MS1 10 permit the user to know if station "Bob" MS3 70, for example, is available before the user of MS1 10 bothers to place a call. The use of a group-distribution base station permits a virtual DSS function to be established, through relays.

The same concept is applicable when neither of two members of the dedicated system are communicating through DBS 50. That is, MS3 70 and MS4 72 are part of the DSS group associated with DBS 50, but MS3 70 and MS4 72 are able track the status of each other and have one key accessibility to each other through the public system. Through special protocols in the public system, MS3 70 and MS4 72 maintain their DSS relationship to each other without the direct involvement of DBS 50.

In another related aspect of the invention, MS3 70 and MS4 72 have a DSS status and access relationship without being part of the private system involving DBS 50 and MS1 10. Through special protocols, MS3 70 is able to track the status of and access a select group of stations, such as MS4 72, exclusively through the public network. Likewise, MS4 72 has a DSS relationship with a selected subset of stations in the public system. The subsets of stations selected by MS3 70 need not be the same as the group selected by MS4 72. Each mobile stations is able to select a unique group of stations to establish a DSS relationship with, in some aspects of the invention. DSS keys 16 and associated BLFs 24 are the same as described above, and shown of FIGS. 1 and 2. Further, it is possible for stations to use line-select and DSS functions, while registered in both private 46 and public 48 systems. That is, MS3 70 is able to monitor (with DSS BLFs) MS1 10 in private system 46, while monitoring MS4 72 in public system 48, even when MS4 72 is not one of the stations associated with private system 46. Likewise, MS3 70 is able to select a line in private system 46 while monitoring MS4 72, when MS4 72 is not one of the stations associated with private system 46.

It is also possible for the players in private system 46 including at least one dedicated station DBS 50 to retain line-select privileges. As described above, the mobile stations have a line-select mode of operation, with a first plurality of line-select keys, which when activated operate in the line-select mode. The first plurality of line-select keys corresponds to the first plurality of telephone circuits which are selected when a line-select key is activated, whereby a virtual line-select/DSS system is established.

In the simplest aspect, MS3 70 has a BLF to describe the status of telephone circuits 56, even when operating in, and connected to DBS 50 through public system 48. If, for example, MS3 70 notices that all three lines 56 are being used, there is no point in placing a call to MS1 10. In a more complex aspect of the invention, MS3 70 "captures" one of telephone circuits 56 in placing a call, to a station in private system 46, to a member of private system 46 operating in public system 48, or to just a common member of public system 48. This allows novel accounting and billing options to stations operating in public system 48. BLFs 24 and line-select keys 14 operate as described above and shown in FIGS. 1 and 2.

In some aspects of the invention, the line-select mode of operation is combined with DSS function, in an exclusively public system 48, or a combination of private 46 and public 48 systems. Likewise, the BLF features are combined with the line-select, combined with the DSS, or combined with the line-select and DSS modes in an exclusively public, or private/public 46/48 system. Further, the various types of mode select, BLF disable, and indicator options described above, and shown in FIGS. 1–3 are applicable to the above-described mobile stations operating exclusively in public system 48, or in a combination of private 46 and public 48 systems.

As described above, in some aspects of the invention, the mobile stations further comprise a busy lamp field (BLF). The BLF including a first plurality of line-select signal indicators and a second plurality of DSS signal indicators, with each of the line-select indicators corresponding to one of the line-select keys, and each of the DSS indicators corresponding to one of the DSS keys. The line-select indicator signals the availability of the corresponding telephone circuit, and the DSS indicator signals the availability of its corresponding station, whereby the indicators signal the availability of stations and dedicated land-lines.

As described above, in some aspects of the invention, the first and second plurality of keys operate in a second, telephone keypad mode. A mode switch selects the mode in which keys are active. Each key is identified with a corresponding telephone keypad alphanumeric character. The second mode of operation permits the keys to select a telephone number, whereby each mobile station has the traditional dialing function.

FIG. 5 illustrates a channel-select feature of the present invention. Mobile stations have a channel-select mode to secure wireless communication channels between a base station in the public system, and a mobile station. At least one base station, BS1 60 for example, is interfaced with a first plurality of wireless communication channels, represented by lines 74a, 74b, and 74c, to mobile stations, such as MS3 70. The channels are separate radio or microwave frequency allocations, or channels differentiated with respect to time or spread spectrum codes, as is well known in the art. The system includes the mobile stations having a first plurality of keys having a channel-select mode of operation, as opposed to a line-select mode. A first plurality of wireless channels corresponds to the first plurality of channel-select keys, which are selected when channel-select keys are activated. Returning to FIG. 1, keys 14 are channel-select keys in this aspect of the invention.

The channel-select function is especially useful for users willing to pay a premium to obtain the use of the wireless channel. Channels are set aside for the exclusive use of a special user group, not necessarily a private system, in some aspects of the invention. Although these wireless channel appear to be dedicated to the user, the frequencies is of these so-called dedicated channels are actually juggled and real-located constantly, even in the middle of communications. Alternately, the users are given a higher priority over all traffic channels so that the probability of capturing a channel is higher than for the average user. Each one of the first plurality of channel-select keys correspond to the first plurality of wireless communication channels which are selected when a channel-select key is activated. A virtual channel-select is established between mobile stations. In some aspects on the invention, the invention is just the channel-select mode, and related BLF in association with a public system. The DSS function, and related BLF is added in other aspects of the invention. Typically, the keypad mode of operation is also included, as described in detail, above. In some aspects of the invention, the channel-select function is used exclusively in a public communications system. Alternately, it is used with a mobile station operating in both private and public networks.

FIG. 6 is a flowchart illustrating a method of incorporating line-select/direct station selection (DSS) modes of operation in a mobile stations. Step 100 provides a communication system including at least one dedicated transceiving base station interfaced to a first plurality of telephone circuits, and a plurality of transceiving mobile stations. Step 102 establishes a process to operate in the line-select mode. Step 104 establishes a first plurality of keys having the line-select function, with each line-select key corresponding to a telephone circuit. Step 106 activates a line-select key corresponding to an available telephone circuit. Step 108, in response to activating the line-select key, captures the telephone circuit for use by the mobile station.

Step 110 establishes a process to operate in the DSS mode. Step 112 establishes a second plurality of keys having the DSS function, with each DSS key corresponding to one of the second plurality of direct dial telephone numbers, or stations. Step 114 activates a DSS key. Step 116, in response to activating the DSS, accesses the corresponding station. Step 118 is a product where the mobile station is able to select land-lines and directly link to a predefined group of stations.

In some aspects of the invention, Step 100 provides a plurality of busy lamp field (BLF) indicators, including a first plurality of line-select indicators, with each line-select indicator corresponding to one of the telephone circuits, and a second plurality of DSS indicators, with each DSS indicator corresponding to a station. Further steps precede Step 104. Step 102a establishes a correspondence between the first plurality of line-select indicators and the first plurality of line-select keys. Step 102b, using the line-select indicators, signals the availability of the telephone circuits. Then, Step 106 includes activating the line-select key, at least partially, in response to the line-select indicator signal.

Further steps precede Step 112. Step 110a establishes a correspondence between the second plurality of DSS indicators and the second plurality of DSS keys. Step 110b, using the DSS indicators, signals the status of the stations. Then Step 114 includes activating the DSS key, at least partially, in response to the DSS indicator signal.

In some aspects of the invention, Step 100 provides a plurality of alphanumeric indicators so that the process incorporates a second, telephone keypad mode of operation. Step 120 disables the first, line-select/DSS mode of key operation, and enables the second, telephone keypad mode. Step 122 establishes a process to operate in the second mode. Step 124 establishes a correspondence between the plurality of alphanumeric indicators and the plurality of keys. Step 126, in response to the relationship established in Step 124, activates the keys to manually dial a telephone number, whereby the mobile station keys perform the traditional dialing function.

In some aspects of the invention a mode selection switch is provided in Step 100. Then, Step 120 includes disabling the first, line-select/DSS mode, and enabling the second, telephone keypad mode with the mode selection switch. A further step follows Step 126. Step 128, using the mode selection switch, disables the second, telephone keypad mode, and enables the first, line-select/DSS mode of operation.

In some aspects of the invention, Step 120 includes activating the mode selection switch, from the mobile station, to enable the second, telephone keypad mode of operation, and Step 128 includes activating the mode selection switch, from the mobile station, to activate the first, line-select/DSS mode of operation.

In some aspects of the invention, Step 100 provides a logic section, including a list of mode selection criteria, to the mobile station. Then, Step 120 includes using the logic section to automatically activate the mode selection switch to enable the second, telephone keypad mode of operation after the logic section determines that the criterion has been satisfied. When a line-select key is included in the mode selection criteria, Step 120 includes activating a line-select key to enable the second, telephone keypad mode of operation, whereby a telephone number is entered after a line is captured.

In some aspects of the invention, Step 100 includes the mode selection switch being activated by user command. Then, Steps 120 and 128 include a user activating the mode selection switch to change the mode of operation for the keys.

When Step 100 provides a protective cover, which closes to cover the keys and opens to reveal the keys, the protective cover is operatively connected to the mode selection switch. Step 120 includes closing the protective cover to automatically activate the mode selection switch to engage the second, telephone keypad mode of operation after the cover is closed, whereby battery power is saved by deactivating the BLF indicators. In some aspects of the invention Step 128 includes opening the protective cover to automatically activate the mode selection switch to engage the first, line-select/DSS mode of operation. Alternately, when Step 100 provides that the protective cover is operatively connected to the BLF indicators, alternate steps (not shown) include closing the protective cover to disable the BLF indicators, and enabling the BLF indicators when the protective cover is opened. In this manner, battery power is saved by deactivating the BLF indicators when the cover is closed.

In some aspects of the invention Step 100 provides that the mode selection switch is activated by base station commands. Then, Steps 120 and 128 include a base station command activating the mode selection switch to change the mode of operation for the keys.

When Step 100 provides that the BLF indicators and alphanumeric characters are integral to the keys, Step 106 includes manipulating the indicator to capture a telephone circuit, and Step 114 includes manipulating the indicator to activate a station connection, and Step 124 includes manipulating the indicators to enter a telephone number.

In some aspects of the invention Step 100 provides BLF indicators as light arrays, to communicate alphanumeric characters and pictures, integral to the keys. Then, Step 106 includes manipulating the indicator to capture a telephone circuit, Step 114 includes manipulating the indicator to access a station, and Step 124 includes manipulating the indicators to enter a telephone number, whereby the functions are made clearer to the user. When the BLF indicators and keys are integral to an LCD display with sensors, Step 106 includes interacting with the LCD screen to capture a telephone circuit, Step 114 includes interacting with the LCD screen to access a station, and Step 124 includes interacting with the LCD screen to enter a telephone number, whereby the keys are virtual keys that are activated by the LCD screen sensors.

Typically, Step 100 provides that the DSS functions include idle, busy, on hold, ringing, and off. Then, Step 110*b* includes the BLF providing a unique signal for each DSS function. When Step 100 provides the mobile stations with a direct, "walkie-talkie" mode of operation to communicate directly between selected mobile stations, without using the base station as a relay, an additional DSS function is provided to monitor the use of a station's walkie-talkie mode. Step 110*b* includes the BLF providing a unique signal for the walkie-talkie DSS function.

In some aspects of the invention, Step 100 provides a communication system including a plurality of transceiving public base stations and a plurality of transceiving mobile stations. The method of incorporating direct station selection (DSS) modes of operation in the mobile stations of a group distributed system is likewise described in Steps 110–116, where a mobile station is able to select from a predefined group of mobile stations.

When Step 100 also provides at least one dedicated, private base station interfaced with a first plurality of telephone circuits, the method of incorporating a line-select mode of operation in the mobile stations is described in Steps 102–108, where a line is selected by mobile stations registered in both public and private systems.

When Step 100 provides a plurality of busy lamp field (BLF) indicators, including a first plurality of line-select indicators, with each line-select indicator corresponding to one of the telephone circuits, and a second plurality of DSS indicators, with each DSS indicator corresponding to a station, the method Steps 102*a* and 102*b*, described above, are applicable to the system and Step 106 includes activating the line-select key, at least partially, in response to the line-select indicator signal. Likewise, method Steps 110*a* and 110*b* are applicable to the system so that Step 114 includes activating the DSS key, at least partially, in response to the DSS indicator signal.

When Step 100 provides a plurality of alphanumeric indicators, the method of this communication system also incorporates a second, telephone keypad mode of operation, as described in Steps 120–126, above.

FIG. 7 illustrates a flowchart of an alternate aspect of the present invention method for operating in the channel-select mode. Step 200 provides a communication system including at least one transceiving base station operatively connected to mobile stations with a first plurality of wireless communication channels, and a plurality of transceiving mobile stations having a channel-select mode of operation. Step 202 establishes a first plurality of keys having the channel-select function, with each channel-select key corresponding to a dedicated wireless communication channel. Step 204 activates a channel-select key corresponding to an available wireless communication channel. Step 206 captures that channel for use by the mobile station. Step 208 is a product where a wireless link is secured with a single keystroke.

When Step 200 provides a plurality of busy lamp field (BLF) indicators, including a first plurality of channel-select indicators, with each channel-select indicator corresponding to one of the wireless communication channels, further steps precede Step 204. Step 202*a* establishes a correspondence between the first plurality of channel-select indicators and the first plurality of channel-select keys. Step 202*b*, using the channel-select indicators, signals the availability of the wireless communication channels. Then, Step 204 includes activating the channel-selection key, at least partially, in response to the channel-selection indicator signal.

As in the other above-described systems, in some aspects of the invention, Step 200 provides a second plurality of stations. Then, Step 202*c* establishes a second plurality of keys having a DSS function, with each DSS key corresponding to a predetermined station. Step 202*d* establishes a correspondence between a second plurality of DSS indicators and the second plurality of DSS keys. Step 202*e*, using the DSS indicators, signals the status of stations. Step 204*a* activates the DSS key, at least partially, in response to the DSS indicator signal. Step 206*a* accesses the corresponding station, whereby the mobile station is able to directly link to a sub-group of stations in the wireless system. The channel-mode is combined with a second mode, keypad function in some aspects of the invention, as described in detail above.

A system and method has been described above which permits the classic concepts of line-selection and direct station selection to be applied to a wireless telephone system. The concepts are applicable to small systems with a dedicated, or a system of dedicated base stations. It is also applicable to a system of group distributed public base stations and combinations of group distributed and dedicated base stations. Other variations and embodiments of the present invention will occur to those skilled in the art.

What is claimed is:

1. A wireless communications system including at least one dedicated transceiving base station interfaced to a first plurality of telephone circuits and including a plurality of transceiving mobile stations, each mobile station comprising:

a plurality of keys, including a first plurality of line-select keys, each said line select key corresponding to a telephone circuit selected from the group including dedicated land-lines and wireless traffic channels for selecting and capturing said corresponding telephone circuit when the line select key is activated such that communication with said mobile station is established via said selected telephone circuit; and a second plurality of DSS keys, each said DSS key corresponding to a selected one of a second plurality of mobile and landline stations, such that when a DSS key is activated, said selected one of said second plurality of stations is directly accessed, whereby either a selected telephone circuit or a selected one of a plurality of stations is selected by activating a single key.

2. A system as in claim 1 in which each mobile station further comprises:

a busy lamp field (BLF), said BLF including a first plurality of line-select indicators, each of said line-select indicators corresponding to one of said line-select keys and signaling the availability of the corresponding telephone circuit; and including a second plurality of DSS indicators, each of said DSS indicators corresponding to one of said DSS keys and signaling the availability of the selected station to which the DSS key corresponds, whereby the indicators signal the availability of telephone circuits and selected mobile stations.

3. A system as in claim 2 wherein said first and second plurality of keys operate in a second, telephone keypad mode, and the mobile stations further comprising:

a mode switch, which when activated selects between the line-select/DSS mode and the keypad mode of operation;

in which each said key is identified with a corresponding telephone keypad alphanumeric character; and in which the second mode of operation permits said keys to manually dial a telephone number, whereby each mobile station dual-function keys include the traditional dialing function.

4. A system as in claim 3 in which said mobile station mode switch is activated by the mobile station.

5. A system as in claim 3 in which said mobile stations further include a logic unit having an output operatively connected said mode switch, with said logic unit activating said mode switch.

6. A system as in claim 4 in which each mobile station includes a list of criteria required to activate said mode switch, and in which the mobile station automatically activates said mode switch to operate in the second, telephone keypad mode of operation, from the first mode, when the criteria are met.

7. A system as in claim 6 in which the mode selection criteria includes enabling the second, keypad mode of operation after activating one of said line-select keys, whereby a telephone number is subsequently dialed after a telephone line is secured.

8. A system as in claim 4 in which the mode switch is activated by a mobile station user command, whereby the user selects the mode of operation for said dual-mode keys.

9. A system as in claim 4 in which each mobile station further includes a protective cover which closes to cover said keys and opens to reveal said keys, said cover operatively connected to said mode switch; and in which said mode switch is automatically activated to select the second, telephone keypad mode of operation when said cover is closed, whereby battery power is saved by deactivating said indicators.

10. A system as in claim 9 in which said mode switch is automatically activated to select the first, line-select/DSS mode of operation when said cover is opened.

11. A system as in claim 3 in which each mobile station further includes a BLF disable switch, which when activated, disables said BLF indicators;

a protective cover which closes to cover said BLF indicators and opens to reveal said BLF indicators, said cover operatively connected to said BLF disable switch; and in which said BLF disable switch is automatically activated to disable said BLF indicators when said cover is closed, whereby battery power is saved by deactivating said indicators.

12. A system as in claim 11 with the mobile stations further comprising a logic unit having an input operatively connected to said cover and an output operatively connected said BLF switch, said logic unit activating said BLF disable switch when said cover is closed.

13. A system as in claim 3 in which said mobile station mode switch is activated by the communicating base station.

14. A system as in claim 3 in which said BLF indicators and alphanumeric characters are integral to said corresponding keys, whereby each said key signals its function.

15. A system as in claim 14 in which said integral BLF indicators are lights.

16. A system as in claim 14 in which said integral BLF indicators are light arrays to communicate patterns of alphanumeric characters and pictures, whereby the line-select/DSS functions are clear to the user.

17. A system as in claim 14 in which said BLF indicators and keys are integral to an LCD display with sensors, with said keys being virtual keys that are virtually activated by interaction with said LCD screen.

18. A system as in claim 1 in which said DSS keys includes DSS functions selected from the group consisting of idle, busy, on hold, ringing, and off, and in which each DSS function is indicated by an indicator on the mobile station keypad, each DSS function having a distinct indicator signal pattern.

19. A wireless communications system including at least one transceiving base station operatively connected to a plurality of wireless communication traffic channels and including a plurality of transceiving mobile stations, each mobile station comprising:

a plurality of keys, including a first plurality of channel-select keys, which when a selected key is activated, operates to select a corresponding dedicated wireless communication traffic channel such that communication with said mobile station is established via said selected wireless communication traffic channel; and a first plurality of channel-select signal indicators, each of said channel-select indicators corresponding to one of said channel-select keys, wherein each said channel-select indicator signals the availability of the corresponding wireless communication traffic channel, whereby the indicators signal the availability of channels.

20. In a communication system including at least one dedicated transceiving base station interfaced to a first plurality of telephone circuits, and a plurality of transceiving mobile stations, a method of incorporating line-select/direct station selection (DSS) modes of operation in the mobile stations comprising the steps of:

a) operating in the line-select mode as follows:
1) establishing a first plurality of keys having the line-select function, with each line-select key corresponding to a telephone circuit selected from the group including dedicated land-lines and wireless traffic channels;
2) activating a line-select key corresponding to an available telephone circuit; and
3) in response to activating the line-select key, capturing the corresponding telephone circuit for use by the mobile station; and b) operating in the DSS mode as follows:
1) establishing a second plurality of keys having the DSS function, with each DSS key corresponding to one of the second plurality of stations;
2) activating a DSS key; and
3) in response to activating the DSS, accessing the corresponding station, whereby the mobile station is able to select land-lines and directly link to a predefined group of stations.

21. A method as in claim 20 in which a plurality of busy lamp field (BLF) indicators are provided, including a first plurality of line-select indicators, with each line-select indicator corresponding to one of the telephone circuits, and a second plurality of DSS indicators, with each DSS indicator corresponding to a station, and including further sub-steps, preceding sub-Step a)1), of:

establishing a correspondence between the first plurality of line-select indicators and the first plurality of line-select keys; and using the line-select indicators, signaling the availability of the telephone circuits;

in which sub-Step a)2) includes activating the line-select key, at least partially, in response to the line-select indicator signal;

in which further sub-steps are included, preceding sub-Step b)1), of:

a establishing a correspondence between the second plurality of DSS indicators and the second plurality of DSS keys; and using the DSS indicators, signaling the status of the stations; and in which sub-Step b)2) includes activating the DSS key, at least partially, in response to the DSS indicator signal.

22. A method as in claim 20 wherein a plurality of alphanumeric indicators are provided, and wherein the mobile stations incorporate a second, telephone keypad mode of operation, the method comprising the additional steps of:

c) disabling the first, line-select/DSS mode of key operation, and enabling the second, telephone keypad mode;

d) operating in the second mode of operation as follows:

1) establishing a correspondence between the plurality of alphanumeric indicators and the plurality of keys; and
2) in response to the relationship established in sub-Step d)1), activating the keys to manually dial a telephone number, whereby the mobile station keys perform the traditional dialing function.

23. A method as in claim 22 wherein a mode selection switch is provided, and in which Step c) includes disabling the first, line-select/DSS mode, and enabling the second, telephone keypad mode with the mode selection switch, and including a further step, following Step d), of:

e) using the mode selection switch, disabling the second, telephone keypad mode, and enabling the first, line-select/DSS mode of operation.

24. A method as in claim 23 in which Step c) includes activating the mode selection switch, from the mobile station, to enable the second, telephone keypad mode of operation, and in which Step e) includes activating the mode selection switch, from the mobile station, to activate the first, line-select/DSS mode of operation.

25. A method as in claim 24 wherein a logic section, including a list of mode selection criteria, is provided in the mobile station, and in which Step c) includes using the logic section to automatically activate the mode selection switch to enable the second, telephone keypad mode of operation after the logic section determines that the criterion has been satisfied.

26. A method as in claim 25 wherein selecting a line-select key is included in the mode selection criteria, and in which Step c) includes activating a line-select key to enable the second, telephone keypad mode of operation, whereby a telephone number is entered after a line is captured.

27. A method as in claim 24 wherein the mode selection switch is activated by user command, and in which Steps c) and e) includes a user activating the mode selection switch to change the mode of operation for the keys.

28. A method as in claim 24 wherein a protective cover is provided which closes to cover the keys and opens to reveal the keys, and wherein the protective cover is operatively connected to the mode selection switch, and in which Step c) includes closing the protective cover to automatically activate the mode selection switch to engage the second, telephone keypad mode of operation after the cover is closed, whereby battery power is saved by deactivating the BLF indicators.

29. A method as in claim 28 in which Step e) includes opening the protective cover to automatically activate the mode selection switch to engage the first, line-select/DSS mode of operation.

30. A method as in claim 22 wherein a protective cover is provided which closes to cover the keys and opens to reveal the keys, and wherein the protective cover is operatively connected to the BLF indicators, and including further steps of:

closing the protective cover to disable the BLF indicators; and enabling the BLF indicators when the protective cover is opened, whereby battery power is saved by deactivating the BLF indicators when the cover is closed.

31. A method as in claim 23 wherein the mode selection switch is activated by base station commands, and in which Steps c) and e) includes a base station command activating the mode selection switch to change the mode of operation for the keys.

32. A method as in claim 22 wherein the BLF indicators and alphanumeric characters are integral to the keys, in which Step a)2) includes manipulating the indicator to capture a telephone circuit, in which Step b)2) includes manipulating the indicator to activate a station connection, and in which Step d)2) includes manipulating the indicators to enter a telephone number.

33. A method as in claim 22 wherein the BLF indicators are light arrays, to communicate alphanumeric characters and pictures, integral to the keys, in which Step a)2) includes manipulating the indicator to capture a telephone circuit, in which Step b)2) includes manipulating the indicator to access a station, and in which Step d)2) includes manipulating the indicators to enter a telephone number, whereby the functions are made clearer to the user.

34. A method as in claim 22 wherein the BLF indicators and keys are integral to an LCD display with sensors, in which Step a)2) includes interacting with the LCD screen to capture a telephone circuit, in which Step b)2) includes interacting with the LCD screen to access a station, and in which Step d)2) includes interacting with the LCD screen to enter a telephone number, whereby the keys are virtual keys that are activated by the LCD screen sensors.

35. A method as in claim 21 wherein the DSS functions include idle, busy, on hold, ringing, and off, and in which sub-steps of Step b) includes the BLF providing a unique signal for each DSS function.

36. In a wireless communications system including at least one transceiving base station operatively connected to mobile stations, including a plurality of wireless communication traffic channels, and including a plurality of transceiving mobile stations, a method for selecting a wireless communication traffic channel for establishing communication between a mobile station and the wireless communications system comprising the steps of:

a1) providing a plurality of busy lamp field (BLF) indicators;

a2) providing on each mobile station a first plurality of keys having a channel-select function, each channel-select key corresponding to a dedicated wireless communication traffic channel;

a3) establishing a correspondence between the first plurality of channel-select indicators and the first plurality of channel-select keys;

b) activating a selected channel-select key corresponding to an available wireless communication traffic channel; and c) capturing that wireless communication traffic channel for use by the mobile station.

37. A method as in claim 36 including the steps of:

a4) using the channel-select indicators, signaling the availability of the wireless communication traffic channels; and in which Step b) includes activating, at least partially, the channel-select key in response to the corresponding channel-selection indicator signal.

38. A method as in claim 37 wherein a second plurality of stations are provided, and including the further steps of:

d) establishing a second plurality of keys having a DSS function, with each DSS key corresponding to a predetermined station;

e) establishing a correspondence between a second plurality of DSS indicators and the second plurality of DSS keys;

f) using the DSS indicators, signaling the status of stations;

g) activating the DSS key, at least partially, in response to the DSS indicator signal; and h) accessing the corresponding station, whereby the mobile station is able to directly link to a sub-group of stations in the wireless system.

* * * * *